June 20, 1967  H. A. STULTS  3,326,540
TEMPERATURE AND HUMIDITY CONTROL SYSTEM
FOR ENVIRONMENTAL CHAMBERS
Filed Dec. 3, 1964  2 Sheets-Sheet 1

INVENTOR
Herschel A. Stults
By Horton, Davis,
Brewer & Brugman
Attys

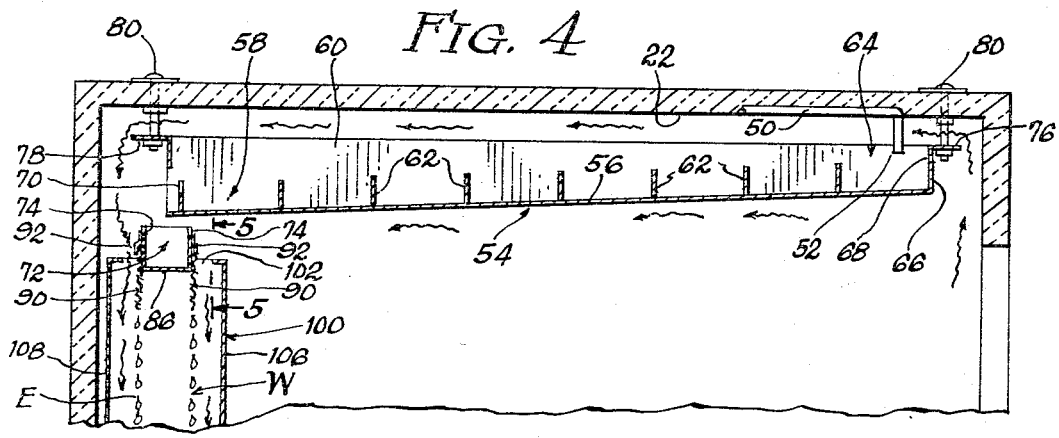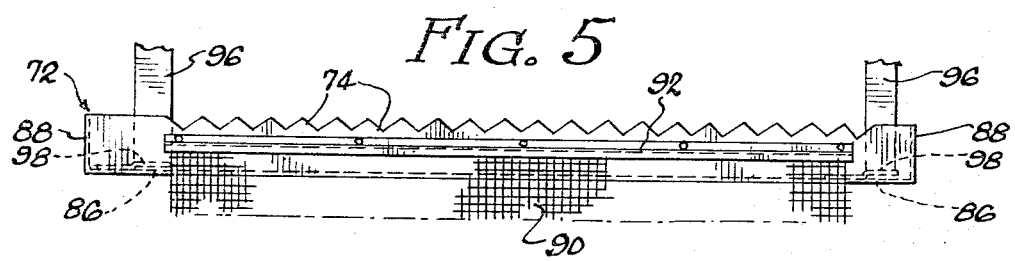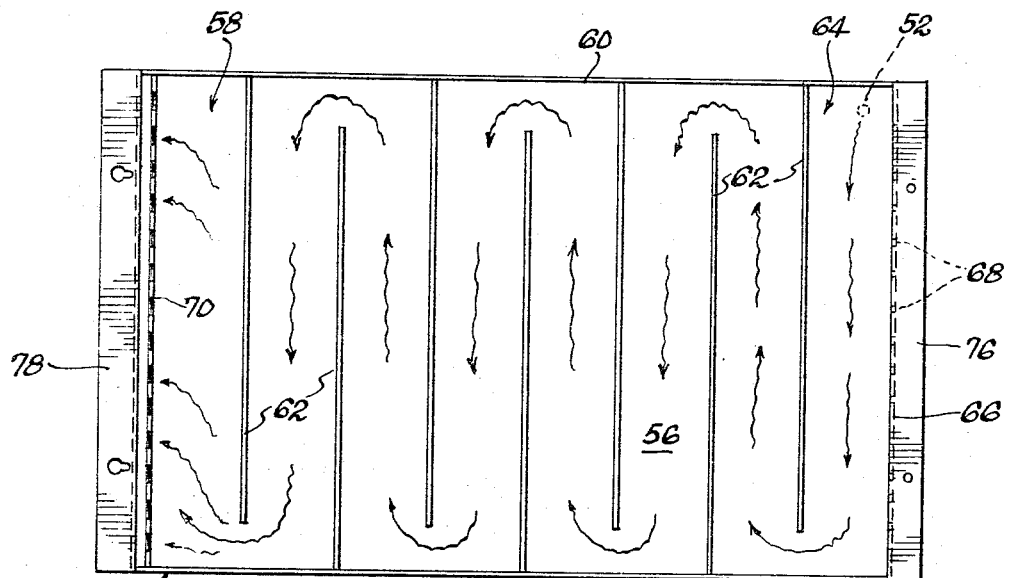

3,326,540
TEMPERATURE AND HUMIDITY CONTROL SYSTEM FOR ENVIRONMENTAL CHAMBERS
Herschel A. Stults, 16 E. Hazel Dell,
Springfield, Ill. 62707
Filed Dec. 3, 1964, Ser. No. 415,715
2 Claims. (Cl. 261—138)

This invention relates to a temperature and humidity control system for environmental chambers.

Portable and permanent environmental chambers such as seed germinating chambers, plant growth chambers, entomological chambers and the like have been known and used for many years. They are important both in testing and experimental work as well as in commercial applications. One of the distinct innovations in environmental chambers made a number of years ago was the provision of a water curtain internally of such chambers to assist in the maintenance of suitable and preselected temperature and humidity levels. In such devices means are provided for heating and cooling, as necessary, a body of water which is continuously recycled and reintroduced into the chamber thereby to maintain temperatures and humidities in such chambers at preselected levels.

The improved structure of this invention provides means for more closely maintaining preselected humidity and temperature levels in environmental chambers and for increasing the circulation of the air in such chambers thereby obtaining a greater uniformity of temperature and humidity throughout the chamber.

It is therefore an object of this invention to provide an improved environmental chamber of the water curtain type in which means are provided for maintaining preselected humidity and temperature levels throughout said chamber.

Another object of this invention is the provision of means for increasing air circulation in an enclosed environmental chamber of the water curtain type for closely maintaining preselected temperature and humidity levels throughout the enclosed chamber.

It is a further object of this invention to provide in combination with an air-filled environmental chamber of the water curtain type means cooperable with a water curtain for shielding contained, spaced, growth trays from said water curtain and for increasing the circulation of the air throughout the chamber thereby increasing the rates of heat and moisture transfer and exchange between the air and said water curtain.

Yet another object of this invention is the provision of an improved air-filled environmental chamber having means for dispensing a curtain of water, the improvement comprising means surrounding said curtain of water and cooperating with said curtain of water for increasing the circulation of air in said chamber and for drawing air into contact with said curtain of water to increase the rate of heat and moisture transfer and exchange between the air and said curtain of water.

Another object contemplated by this invention is the provision of an air-filled environmental chamber of the water curtain type having improved means for circulating air for effecting more rapid heat and moisture transfer between the water and said air, in which said improved means include an elongated vertically disposed open bottomed shielding means surrounding said water curtain for substantially the length of said water curtain and defining openings intermediate its bottom and its top for drawing air into contact with said water curtain intermediate the vertical extent of said water curtain.

Still a further object of this invention is the provision in an air-filled environmental chamber of a water curtain having a plurality of water curtain elements to increase air circulation in said chamber thereby to maintain preselected internal temperature and humidity levels uniformly throughout said chamber.

Another object of this invention is the provision of an improved air-filled environmental chamber in which said chamber includes a water distributor defining a tortuous path for said water for enhancing air circulation throughout the chamber and to facilitate the maintenance of preselected temperature and humidity levels uniformly throughout the chamber.

This invention may be characterized as improved means for obtaining and maintaining preselected temperature and humidity levels substantially uniformly within and throughout an environmental chamber of the water curtain type. More particularly it includes means cooperable with a water curtain for increasing the circulation of air within an environmental chamber and for enhancing heat and moisture transfer between the water curtain and the air. It also contemplates means for increasing heat and moisture transfer and air circulation at points in an environmental chamber remote from said water curtain. It further contemplates a water curtain having a plurality of water curtain elements to increase air circulation and the rates of heat and moisture transfer to the air of the chamber.

These and further objects and advantages of this invention will become apparent from the following description and drawings of which:

FIG. 4 is an enlarged partial side sectional view of the chamber of FIG. 1;

FIG. 5 is a front view taken substantially along line 5—5 of FIG. 4; and

FIG. 6 is a plan view of the water distributor of FIG. 4.

Figure 1:
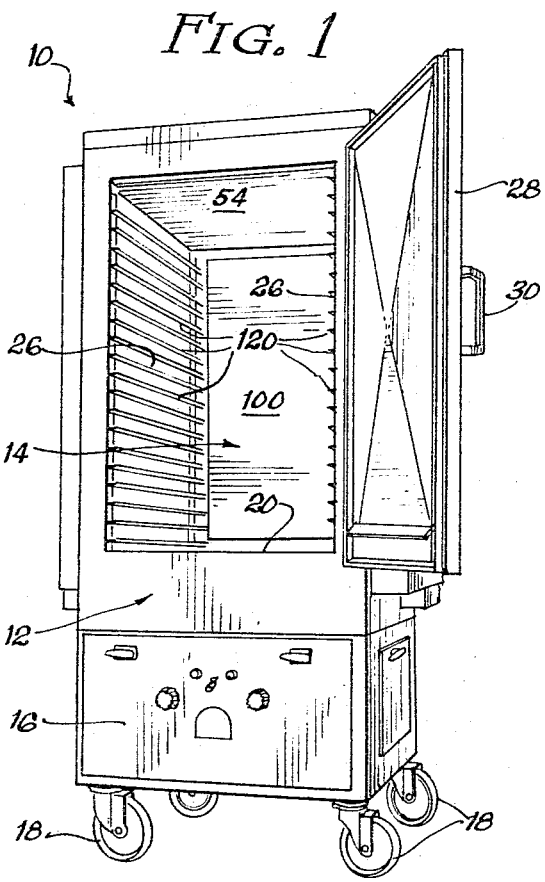
FIG. 1 is a front perspective view of a portable environmental chamber of this invention with the chamber in an open position.
Figure 2:
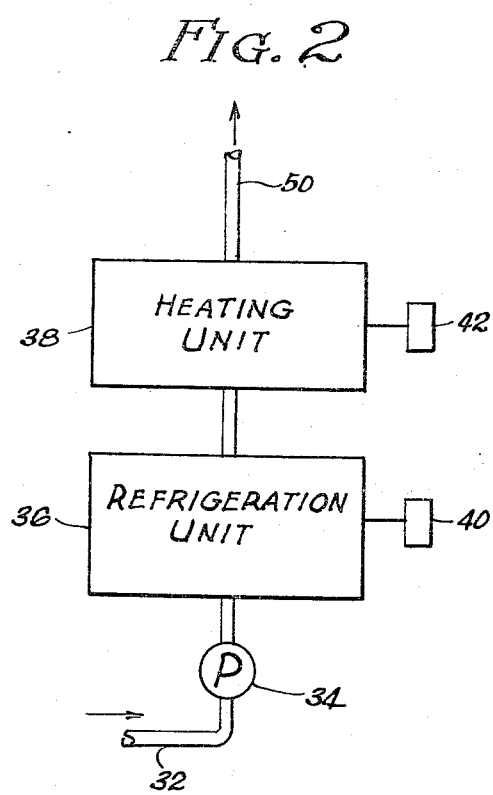
FIG. 2 is a schematic diagram of means for heating and cooling water to be supplied to the chamber.

Referring first to FIG. 1, a portable environmental device 10 of this invention is there shown. It includes a cabinet 12 having an environmental chamber 14 and a lower service section 16. It is supported for movement upon a plurality of casters 18.

The interior of chamber 14 is defined by a floor 20, a ceiling 22, a rear wall 24, side walls 26, and by a door 28 supported on vertical hinges (not shown). These elements may comprise spaced sheet wall members with insulation therebetween. To open and close chamber 14 a door handle 30 is provided.

The service section 16 of portable environmental device 10, in addition to a suitable source of electrical power (not shown), includes a water inlet 32 and a recirculating pump 34 in line therewith. The recirculating pump 34 pumps the water through a refrigeration unit 36 and a heating unit 38 which are operative alternately in response to variations of air temperature in the chamber 14 from a preselected temperature level. For that purpose a cooling thermostat 40 and a heating thermostat 42 are provided to operate the refrigeration unit 36 and the heating unit 38, respectively, in response to temperature sensing means (not shown) in the chamber 14. After being heated or cooled, as the need may be, the water is pumped to the water distributing means of this invention, ultimately to be dispensed within the chamber in a manner to be described.

Figure 3:
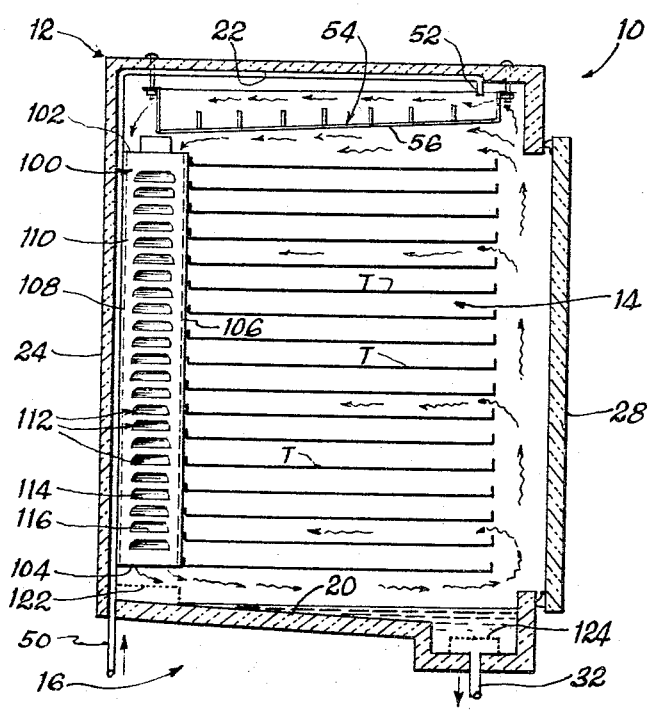
FIG. 3 is a side elevational view partially in section of a portion of the interior of the chamber of FIG. 1.

Referring now to FIG. 3, the temperature conditioned water supply is shown as being pumped upwardly through conduit 50 having a discharge end 52 overlying a water distributor 54. In the embodiment here shown, water distributor 54 is positioned adjacent the ceiling 22 of chamber 14 and includes a floor 56 inclined downwardly from discharge end 52 of conduit 50. As such water flows downwardly toward the discharge portion 58 of distributor 54. Between its vertical sides 60, water distributor 54 is provided with a plurality of diverter fins 62 sealingly connected to floor 56, adjacent fins 62 being sealingly connected alternately to opposite sides 60. Adjacent fins 62 are spaced alternately from sides 60 to direct water from the inlet portion 64 of water distributor 54 in a tortuous path toward discharge portion 58. The path followed by the water is best seen in FIG. 6. The tortuous path greatly increases the exposure of air in the chamber to the water to improve the heat exchange between the air and the water.

To enhance circulation of the air in the air-filled environmental chamber and thereby increase the heat exchange between air and water, water distributor 54 includes a vertical end wall 66 having perforations 68 therein above any anticipated water level to be reached therein, the downward flow of the water in distributor 54 cooperating with ceiling 22 to draw air through perforations 68.

At the discharge portion 58 of water distributor 54 a distributor weir 70 is provided to discharge a uniform body of water into trough 72. Distributor weir 70 is notched in the same manner as trough weirs 74.

Water distributor 54 is provided with mounting flanges 76 and 78 having openings to receive support bolts 80 which in turn are suspended from ceiling 22. When support bolts 80 and the associated nuts are appropriately adjusted and positioned, water distributor 54 will be suspended somewhat below ceiling 22. The spacing will depend upon a number of readily appreciated factors and is adjustable to enhance air circulation.

As seen in FIG. 4, the water flowing over weir 70 of discharge portion 58 is received in trough 72. Trough 72 is open topped, is elongated and has a floor 86, ends 88 and trough weirs 74. When the water level in the trough reaches the level of the notches in trough weirs 74, it overflows the weirs outwardly and flows onto drip screens 90. Drip screens 90 are anchored to trough weirs 74 below the levels of the notches by drip screen clips 92. Screens 90 spread the water overflowing trough weirs 74 to provide a water curtain W having a plurality of water curtain elements E, in this instance two water curtain elements E.

Trough 72 is suitably supported from ceiling 22 by clip-on mounting brackets 96 and trough ears 98. Brackets 96 may be suspended from the same nuts and bolts used to suspend the discharge end of water distributor 54.

Adjacent the drip screens 90 and trough 72 a vertical shielding and air circulating duct 100 is provided. This duct extends downwardly almost to floor 20. It is substantially rectangular in cross section and is open at its top 102 and its bottom 104. It is defined by a front panel 106, a rear panel 108 and side panels 110. It substantially surrounds but is spaced from water curtain W and water curtain elements E throughout its entire vertical length.

Side panels 110 define a plurality of apertures which are shown as louvers 112 in this embodiment. Louvers 112 include a major panel 114 which slopes inwardly and downwardly. The lower end 116 of panel 114 is located inwardly of the plane of side panels 110. Similar apertures are provided in each side panel 110.

Environmental chamber 14 includes a plurality of tray brackets 120 arranged in pairs, one of each pair being supported on a side wall 26. They are spaced and positioned to support a plurality of stacked but spaced growth trays T. It is to be noted that louvers 112 are positioned so that they are in communication with the spaces between trays T. There may be a lesser, a greater or an equal number of louvers 112 and tray brackets 120.

When the curtain W of water has descended below the lower end of duct 100 it contacts an atomizing screen 122 which assists in the humidification of the air in the environmental chamber. At least a portion of the air leaving the duct 100 contacts the mist produced by the atomizing screen. As a result the fullest possible humidification of that air is made possible to inhibit dehumidification of seeds, plants or other materials being treated in the environmental chamber. After passing through atomizing screen 122 the water of curtain W mixes with the body of water on floor 22, passes into pump 124 and is there drawn into the service section 16 by circulating pump 34 through conduit 32 to be heated or cooled as necessary and to be recirculated in the manner described.

During the operation of chamber 14 door 28 is closed as seen in FIG. 3. Under normal circumstances the atmosphere in the chamber is air, although for experimental purposes other atmospheres might be provided. As such that is contemplated wherever the expressions air, air-filled and the like are used herein. Similarly the liquid utilized normally is water, although other liquids which may be utilized with the means of this invention are also within the contemplation of this invention and the terms water, humidification and the like are used with the understanding that the liquid may be other than water.

A representative air circulation pattern is shown in FIG. 3. There air is drawn upwardly across and beneath water distributor 54 and down and with descending water curtain W. Duct 100 cooperates with water curtain W to draw air downwardly across the rear of growth chamber 14 from above and below water distributor 54. Additionally, air is drawn through louvers 112 to ventilate the spaces between trays T and to prevent stagnation of air therebetween.

In this embodiment several means are provided for increasing the air circulation within the openable environmental chamber, each improving upon the circulation of air, and the maintenance of preselected humidity and temperature levels throughout the chamber over that which occurred in earlier water curtain environmental chambers.

With the improvements of this invention it is possible to secure substantial uniformity of a preselected air temperature throughout an environmental chamber of about ±½° F. That may be obtained not only in a portable environmental chamber of the type illustrated herein but also with a room-sized environmental chamber. The uniformity of temperature and humidity throughout the chamber resulting from the improved circulation of air in the chamber inhibits the growth of fungi and provides a most desirable atmosphere for seeds, plants or other materials or things.

While a specific embodiment of this invention has been described in compliance with the patent statutes, it is clear that modifications may be made therein without departing from the spirit and scope of this invention. The scope of this invention therefore is not intended to be limited to the specific embodiment described and illustrated herein.

I claim:

1. An openable and closeable air-filled environmental chamber for accommodating a plurality of stacked vertically spaced trays comprising internally of said chamber a water inlet, a water distributor defining a tortuous path underlying said water inlet at one end and at its other end discharging into trough means, means connected to said trough means for dispensing a descending curtain of water therefrom, an elongated vertical shield surrounding said curtain and extending from adjacent said trough means to adjacent the floor of said chamber, said vertical shield defining intermediate its ends a plurality of openings, and means for heating and cooling said water outside of said chamber, whereby air inside said chamber is circulated and the humidity and temperature inside said chamber is maintained at uniform preselected levels throughout said chamber.

2. In an openable and closeable air-filled environmental chamber having a plurality of tray support elements for supporting a plurality of stacked vertically spaced trays; means for controlling the temperature and humidity in said chamber and comprising a temperature controlled water supply, means for receiving said water supply internally of said chamber and for dispensing a descending curtain of water spaced from the tray elements, vertically disposed elongated means open at its top and bottom ends surrounding said descending curtain of water and cooperable with said curtain of water to increase the circulation of the air in said chamber, said vertically disposed elongated means being substantially rectangular in horizontal cross-section and having a front, a rear and two sides, said vertically disposed means defining apertures along its vertical length to draw air into said vertically disposed means at points intermediate its ends to enhance the circulation of air in and throughout said chamber, said apertures including spaced louvre means in said sides of said vertically disposed means at positions whereat there is a said louvre means adjacent each of said plurality of tray support elements.

References Cited

UNITED STATES PATENTS

| | | |
|---|---|---|
| 517,825 | 4/1894 | Peple et al. |
| 684,217 | 10/1901 | Gardner et al. |
| 1,880,359 | 10/1932 | Rutishauser _____ 62—310 X |
| 1,950,204 | 3/1934 | Wood et al. _____ 261—117 |
| 2,189,390 | 2/1940 | Belshaw _____ 261—108 X |
| 2,420,993 | 5/1947 | Kelley _____ 261—138 X |
| 2,552,387 | 5/1951 | Whinery _____ 261—151 X |
| 3,011,723 | 12/1961 | Van Weele _____ 261—112 X |

FOREIGN PATENTS

| | | |
|---|---|---|
| 554,063 | 3/1958 | Canada. |

HARRY B. THORNTON, *Primary Examiner.*
RONALD R. WEAVER, *Examiner.*